W. S. BIDLE & J. A. COSTELLO.
MACHINE FOR MAKING HOT PRESSED NUT BLANKS.
APPLICATION FILED APR. 28, 1913.

1,145,227.

Patented July 6, 1915.
6 SHEETS—SHEET 2.

W. S. BIDLE & J. A. COSTELLO.
MACHINE FOR MAKING HOT PRESSED NUT BLANKS.
APPLICATION FILED APR. 28, 1913.

1,145,227.

Patented July 6, 1915.
6 SHEETS—SHEET 5.

Witnesses:
H. J. Gettins.
B. C. Brown.

Inventors.
William S. Bidle
Joseph A. Costello
By
Their Attorneys.

W. S. BIDLE & J. A. COSTELLO.
MACHINE FOR MAKING HOT PRESSED NUT BLANKS.
APPLICATION FILED APR. 28, 1913.

1,145,227.

Patented July 6, 1915.
6 SHEETS—SHEET 6.

UNITED STATES PATENT OFFICE.

WILLIAM S. BIDLE AND JOSEPH A. COSTELLO, OF CLEVELAND, OHIO.

MACHINE FOR MAKING HOT-PRESSED NUT-BLANKS.

1,145,227. Specification of Letters Patent. Patented July 6, 1915.

Application filed April 28, 1913. Serial No. 764,007.

*To all whom it may concern:*

Be it known that we, WILLIAM S. BIDLE and JOSEPH A. COSTELLO, citizens of the United States of America, residing at Cleveland, in the county of Cuyahoga, State of Ohio, have invented a certain new and useful Improvement in Machines for Making Hot-Pressed Nut-Blanks; and we do hereby declare the following to be a full, clear, and exact description of the invention, such as will enable others skilled in the art to which it pertains to make and use the same.

This invention relates to improvements in machines for making hot-pressed nut-blanks, and pertains more especially to a machine for pressing a piece of hot metal into a nut-blank which has the external shape and dimensions of a finished nut having a crown-face at one end.

One object of this invention is to effect the reduction to a minimum of the amount of metal required in the production of nut-blanks.

Another object is to produce a hot-pressed nut-blank which not only has the external shape and dimensions of a finished nut having a crown-face at one end, but is provided with a cavity which is circular in end view and arranged at and centrally of said crown-face and extends axially of the blank from said crown-face and is adapted to permit the reception thereby at said crown-face of a tool subsequently employed in elongating said cavity.

Another object is to make said blank uniform circumferentially of said cavity.

Another object is not only to effect the pressing of a piece of hot metal into a blank having the external shape and dimensions of a finished nut, but to form the aforesaid cavity during and by said pressing, to have the aforesaid crown-face of the blank comprise an annular shoulder forming the central portion of said crown-face and arranged concentrically relative to the axis of the blank and surrounding the aforesaid cavity, to have said cavity concentric relative to said shoulder, and to have said shoulder uniform in width circumferentially of said cavity, so that subsequent elongation of said cavity to the extent required to form a hole extending endwise of and through the blank and any tapping of or necessary operation on the blank to complete the formation of a finished nut shall not disturb the concentricity of the cavity at said crown-face relative to said shoulder nor disturb the uniformity in width of said shoulder circumferentially of the cavity.

With these objects in view, and to the end of attaining any other advantage hereinafter appearing, this invention consists in certain features of construction, and combinations and relative arrangement of parts, hereinafter described, pointed out in the claims, and illustrated in the accompanying drawings.

In said drawings, Figs. 6 to 11, inclusive, are drawn full size.

Figure 12:
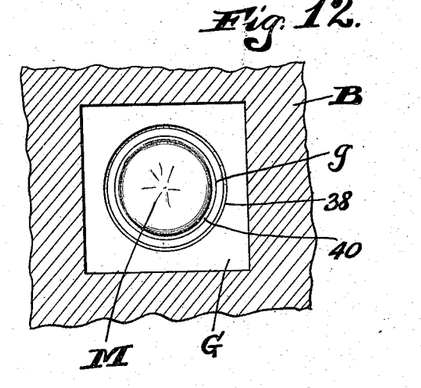
Fig. 12 is a vertical section on line 12—12, Fig. 6.

Referring to the drawings, A indicates the bed of our improved machine, and B represents a stationary tubular die which is shown arranged substantially horizontally (see Figs. 2 and 6) and adapted to receive a hot metal piece which is to be pressed into a nut-blank having the external shape and dimensions of a finished nut and provided with a crown-face at one end and a cavity centrally of said crown-face. Said die is contoured internally in cross-section to conform (see Figs. 6 and 12) to the external contour of a finished nut in cross-section. Said die is rendered stationary in any approved manner, and means for securing a die to the bed A are too well known in the art to require description and illustration in this specification.

Figure 1:
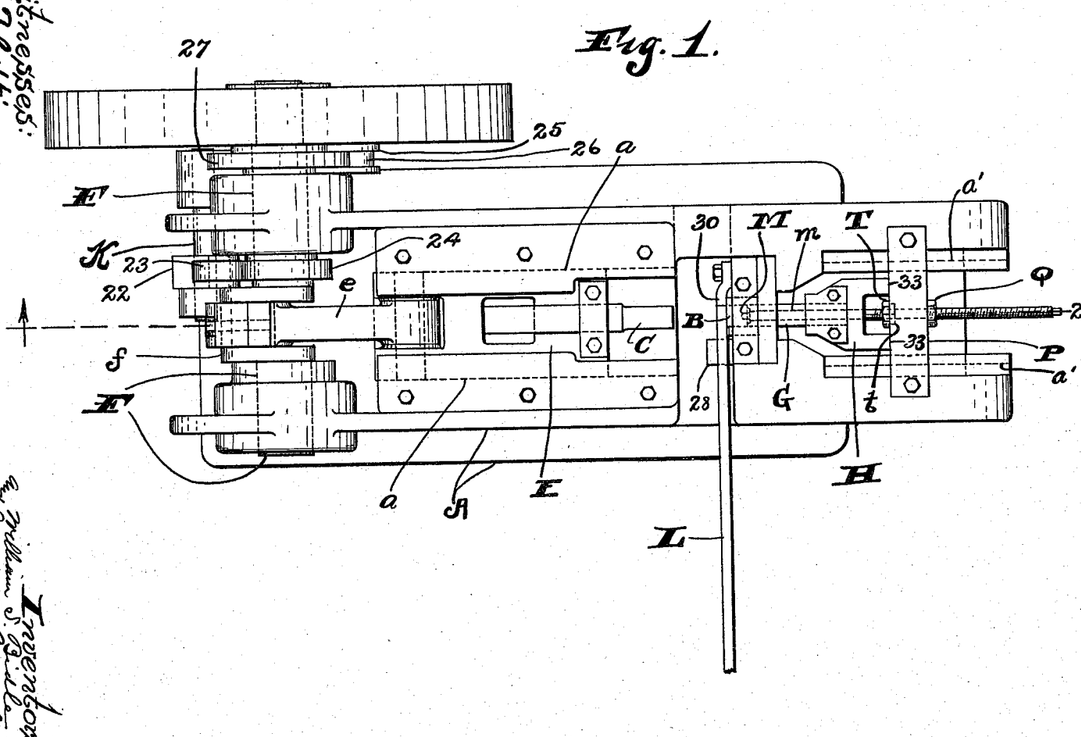
Figure 1 is a top plan of a machine embodying our invention.
Figure 2:
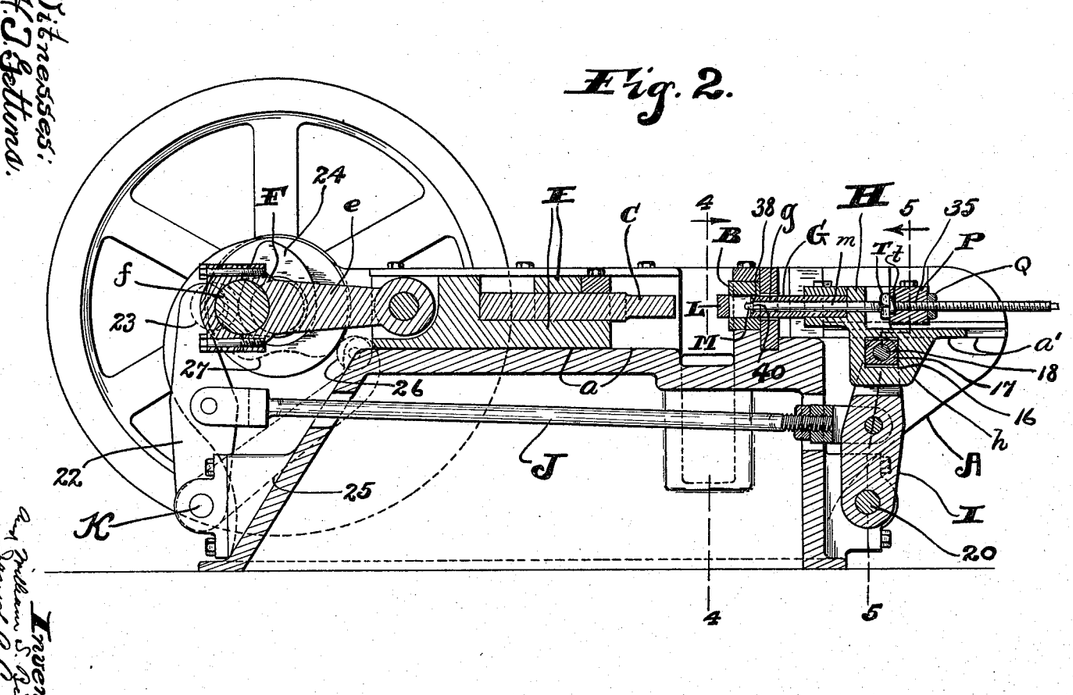
Fig. 2 is a vertical section on line 2—2, Fig. 1.
Figure 7:
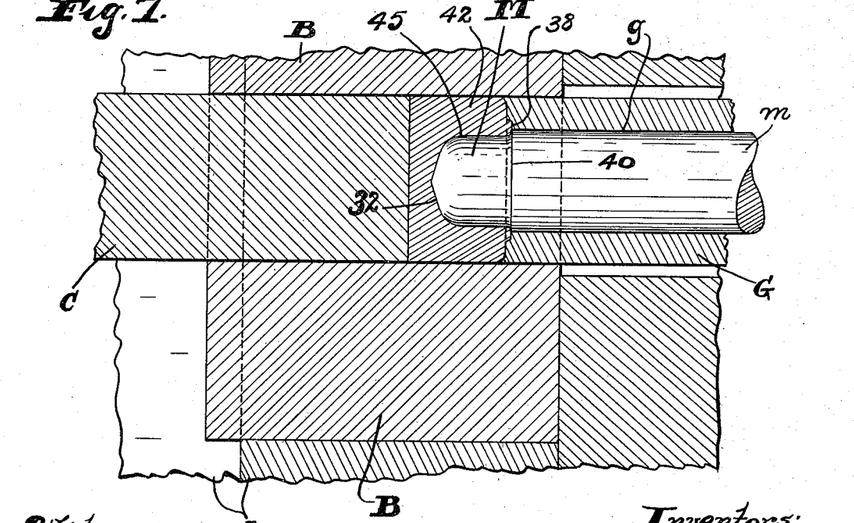
Fig. 7 is a section corresponding with Fig. 6, except that Fig. 7 shows a nut-blank formed by the coöperation of the parts illustrated in Fig. 6.
Figure 11:
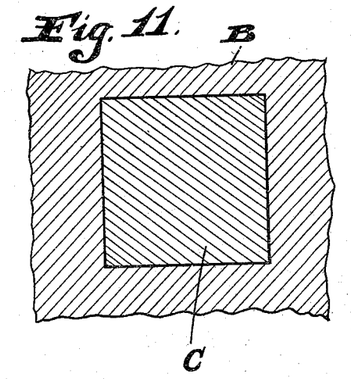
Fig. 11 is a vertical section on line 11—11, Fig. 6.

A horizontally arranged endwise movable plunger C extends the maximum distance into the die B from the forward end or face of the die, as shown in Fig. 7, or is spaced the maximum distance from said die, as shown in Fig. 2, according as the plunger is in the one or the other of its extreme positions. Said plunger is of course contoured externally in cross-section (see Fig. 11) to conform to the internal contour of the die B in cross-section. Said plunger is carried by and suitably secured to a correspondingly arranged slide E which (see Figs. 1 and 2) is arranged forward of and movable toward and from the die B and engages a correspondingly arranged slideway $a$ formed in the bed A. The slide E is actuated in any approved manner, being shown operatively connected by a pitman or link $e$ with the crank $f$ of a suitably supported shaft F which is arranged horizontally and at a right angle to the travel of the said slide.

Figure 6:
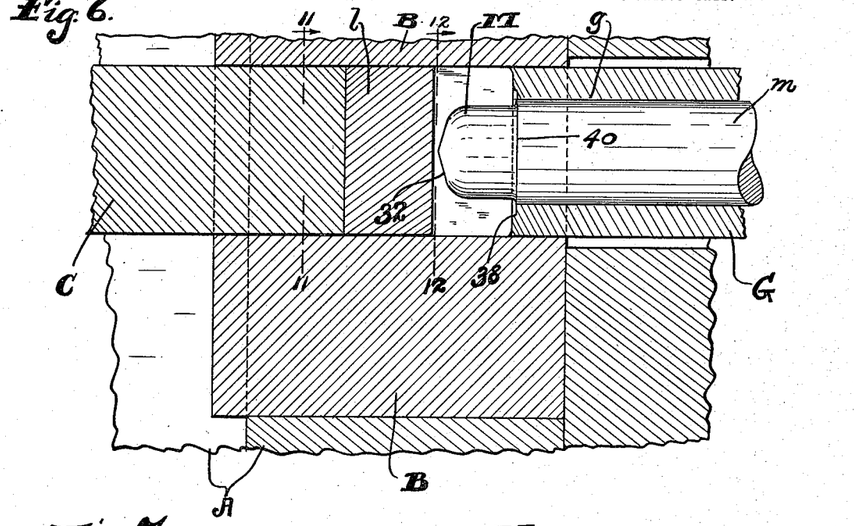
Fig. 6 is a vertical section taken centrally and longitudinally of the tubular metal-receiving die of the machine and illustrates the parts whereby a piece of hot metal is pressed into a nut-blank having the external shape and dimensions of a finished nut and provided at one end with a crown-face and a cavity centrally of said face.

As already indicated, the plunger C is adapted to feed a piece of hot metal into the die B from the face of the die, and a horizontally arranged endwise movable blank-ejector G extends in any position thereof into the die from the rear end of the die. Said ejector is movable endwise of the die B and in its extreme rearward position, shown in Figs. 2, 6 and 7, is spaced far enough from the forward end of the die to permit the hot metal piece which is to be operated on within the die to be inserted into the die by the plunger C and to permit said plunger to enter the die during the movement of said piece of hot metal rearwardly within the die. The ejector G has its forward end or face contoured as required to form a crown-face on the adjacent end of the blank to be formed within the die B and is of course contoured externally in cross-section (see Fig. 12) to conform to the internal contour of the die in cross-section. Said ejector extends the minimum distance into the die B in the extreme rearward position of the ejector.

Figure 3:
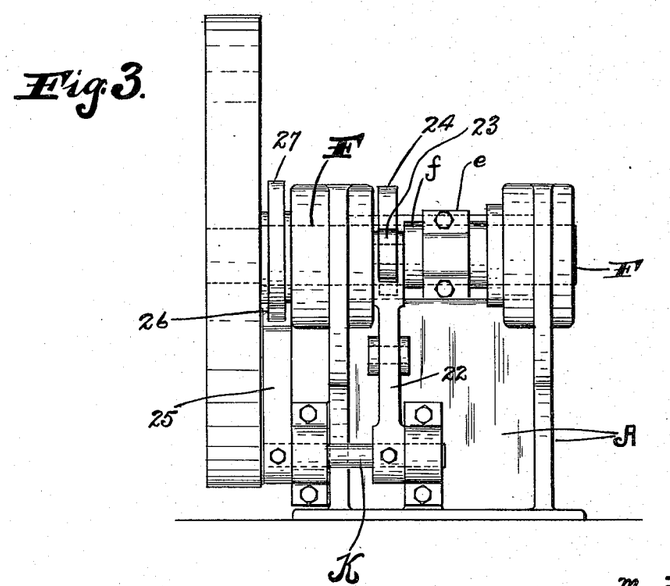
Fig. 3 is a left-hand side elevation relative to Fig. 2.
Figure 4:
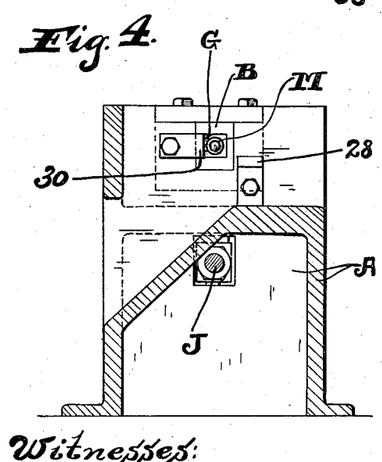
Fig. 4 is a vertical section on line 4—4, Fig. 2, looking in the direction indicated by the arrow, but the hot bar or stock L is omitted in Fig. 4 to avoid interference with the illustration of the die B.
Figure 5:
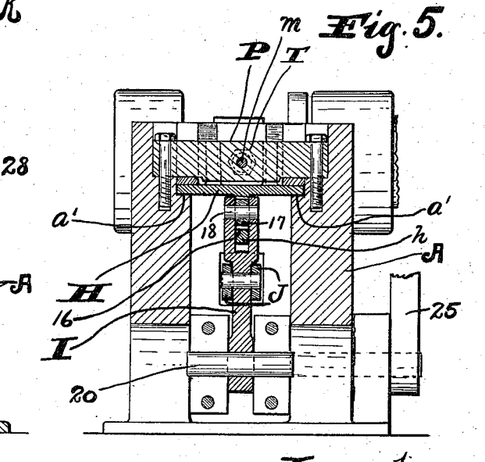
Fig. 5 is a section on line 5—5, Fig. 2, looking in the direction indicated by the arrow.

The ejector G extends into and is suitably secured to and consequently carried by a correspondingly arranged slide H which (see Figs. 1, 2 and 5) is located rearward of and movable toward and from the die B and engages a correspondingly arranged slideway $a'$ formed in the bed A. The slide H is actuated in any approved manner, having a downwardly projecting member $h$ which is shown provided (see Figs. 2 and 5) with a lateral slot 16 engaged by a block 17 which is movable somewhat up and down said slot and shown pivoted, as at 18, to the upper end of a lever I. Said lever is fulcrumed at its lower end, as at 20, to any suitable support and operatively connected by a rod J with the upwardly projecting arm 22 of a rock-shaft K which is parallel with and arranged below the shaft F. The arm 22 is provided at its upper end with a roller 23 engaging the circumferential or working surface of a cam 24 with which the shaft F is operatively provided, as shown in Figs. 2 and 3. The shaft K is also provided with an arm 25 which projects upwardly and in the direction of the slideway $a$ and is provided at its upper end with a roller 26 which engages the circumferential or working surface of a cam 27 with which the shaft F is operatively provided, as shown in Figs. 2 and 3.

The hot bar or stock L from which is to be punched the hot metal piece to be fed into the die B (see Figs. 1 and 2) is shown arranged horizontally and at a right angle to the path of the plunger C and adapted to rest (see Fig. 1) on a seat-forming member 28 with which the bed A is provided at one side of said path. The bed A is shown provided at the opposite side of said path with a stop-forming member 30 arranged to limit the forward movement of the stock L when the stock has been fed forwardly the distance required to bring its forward end-portion into line with said bore preparatory to punching a piece from the stock by the plunger during the forward or feeding movement of the plunger. The manner of feeding the stock, means for supporting said stock, and means for arresting the forwardly endwise movement of the stock are too well known in the art to require further description. Suffice it to state that the stock from which the piece of hot metal is to be punched by the plunger is fed in advance of said plunger preparatory to the forward movement of the plunger, and that during said movement said piece is severed from the stock and introduced into the die. Figs. 1 and 2 show the stock fed in front of the die and in advance of the plunger preparatory to the forward or feeding movement of the plunger.

Figure 8:
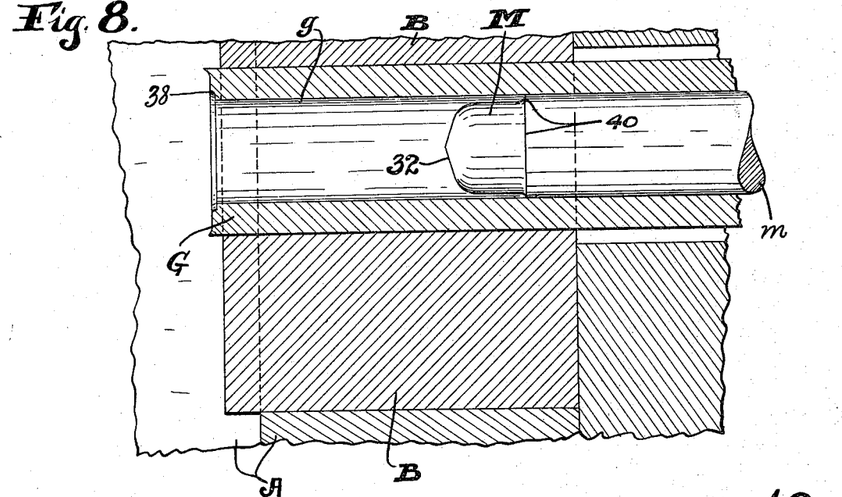
Fig. 8 is a vertical section showing the ejector in position after effecting the discharge from said die of the nut-blank shown formed in Fig. 7.
Figure 9:
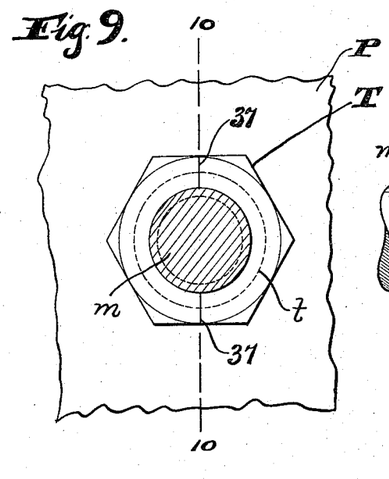
Fig. 9 is a vertical section transversely of and through the rod on which the core in the stationary tubular die is formed, said section being taken forward of the forward nut employed in securing said rod in the desired adjustment.
Figure 10:
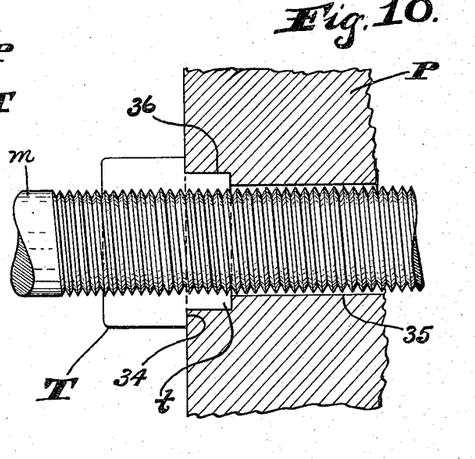
Fig. 10 is a vertical section on line 10—10, Fig. 9.

A stationary metal core M is arranged centrally and longitudinally of the rear portion of the die B and centrally of the ejector G. Said core is parallel with said die and extends forwardly from the face of the ejector G in the extreme rearward position of the ejector. Said core is circular in end view and has its forward end tapering, as at 32, (see Figs. 6, 7 and 8) toward its forward extremity,—that is, toward the forward end of the die B. Said core is small enough transversely to permit movement of the ejector endwise of the core. Said core is formed on the forward end of a metal rod $m$ which is arranged within and longitudinally of the ejector G and extends loosely through the ejector and loosely through the slide H. Said core is therefore integral with said rod. The rod $m$ also extends (see Fig. 2) through a cross-bar P which is arranged horizontally and at a right angle to the travel of the slide H and suitably secured to the bed A. Said cross-bar is therefore stationary and arranged to form a stop for limiting the rearward movement of the slide H which is shown provided (see Fig. 1) with two rearwardly facing shoulders 33 and 33 arranged at opposite sides respectively of the rod $m$ and abutting against the forward side of said cross-bar in the extreme rearward position of the slide. The rod $m$ is screw-threaded from a point a suitable distance forward of the cross-bar P to a point a suitable distance rearward of said cross-bar. A nut Q (see Figs. 1 and 2) is screwed into the rod $m$ at the rear side of said cross-bar and abuts against said side of the cross-bar. A nut T (see Figs. 1, 2, 9 and 10) is screwed onto the rod $m$ at the forward side of said cross-bar and has a circular rear end-portion $t$ and a rearwardly facing shoulder 34 formed at the forward end of said circular portion. Said circular portion of the nut T (see Fig. 10) engages a diametrical enlargement 36 of the forward end of the rod-receiving hole 35 formed in the cross-bar, and the shoulder 34 of said nut abuts against the forward side of the cross-bar. To accommodate the application of the nut T said nut is divided or split centrally and longitudinally, as at 37, Fig. 9, into halves. Opposite halves of the split nut T are applied forward of the cross-bar P to opposite portions of the rod $m$ in the application of said nut, whereupon the halves or sections thus placed in position relative to said rod are manipulated to bring the circular rear end-portion $t$ of the nut into the enlargement 36 of the rod-receiving hole 35 in the cross-bar P and to bring the shoulder 34 of said nut into engagement with the forward side of the cross-bar. It will be observed that proper manipulation of the nuts Q and T renders the rod $m$ free to be adjusted endwise, and said rod is secured in the desired adjustment by tightening said nuts against the cross-bar P. It will be observed therefore that the rod $m$ is held stationary during the operation of the machine through the medium of the cross-bar P and the nuts Q and T. The endwise adjustability of the rod $m$ renders the core M adjustable endwise and consequently renders said core capable of being adjusted relative to the die B and ejector G. When the core M becomes worn to such an extent that a new core is required all that is necessary is to manipulate the split nut T to remove it from within the cross-bar P whereupon the sections composing said nut may be removed from the rod and thereby render the rod removable endwise in a rearward direction whereupon a new core can be formed on the forward end of the rod and then the rod replaced.

By the construction hereinbefore described it will be observed that the rod $m$, and consequently the core M, are stationary but adjustable endwise; that the ejector G is operatively connected by mechanism comprising the slide H, the operative connection between said slide and the lever I, and the rod J, with the arm 22 of the rock-shaft K; that the arm 22 of said rock-shaft is arranged to be actuated by the cam 24 of the shaft F to effect the forward or blank-ejecting movement of the blank-ejector, and that the arm 25 of said rock-shaft is arranged to be actuated by the cam 27 of the shaft F to effect the rearward movement of the blank-ejector. It will be observed therefore that our improved machine comprises means whereby the rock-shaft is rocked in opposite directions alternately during the rotation of the shaft F continuously in one and the same direction and that the ejector is actuated endwise in the one direction or the other according as said rock-shaft is rocked in the one or the other direction, and the parts are so relatively arranged and timed that the ejector is in its extreme rearward position upon the feeding of a hot metal piece into the die B by the plunger C and the ejector moves forwardly during the receding movement of the plunger.

Fig. 6 shows the plunger as having fed a hot metal piece $l$, which has been punched by said plunger from the bar or stock L, into the die B preparatory to the contact by said hot metal piece with the core M, and the relative arrangement of the parts and the dimensions of said hot metal piece are such that during the operation of the machine said piece is pressed against and around the core to completely fill the space around said core from end to end of the core in the extreme rearward position of the ejector. Of course the die B, the forward end of the ejector in the extreme rearward position of the ejector, the core M and the plunger C coöperate in pressing said hot piece of metal fed by the plunger into a nut-blank having the external shape and dimensions of a finished nut and a crown-face at one end.

The rod-receiving hole $g$ in the ejector G (see Figs. 6 and 12) is enlarged diametrically at the forward end of the ejector and uniformly all round the core M so as to form an annular recess 38 in said end and internally of the ejector, which recess extends around the rear end of said core in the extreme rearward position of the ejector and is concentric relative to the core. Said core is provided at its rear end and externally with a forwardly and laterally facing beveled or sloping annular shoulder 40, and the surrounding wall of the recess 38 is arranged opposite said shoulder in the extreme rearward position of the ejector. It will be observed therefore that the core M is diametrically smaller than but arranged centrally relative to the adjacent portion of the rod *m* on which said core is formed, and that the feature of having said rod diametrically larger rearwardly of the core materially strengthens the core. Said core is substantially uniform in thickness between its shoulder 40 and the tapering forward portion 32 of the core. The relative arrangement of the parts is such that the hot metal piece fed rearwardly within the die by the plunger during the forward movement of the plunger is pressed, (being of course of requisite dimensions) into the shape required to cause the pressed body of metal to fill the space formed between the plunger and the ejector and around the core and to fill the recess 38 formed in the forward end of the ejector, so that the hot metal piece operated on during the forward or feeding movement of the plunger has, upon the termination of said movement, been pressed into the external shape and dimensions of the desired blank. In other words, said core is arranged to form an abutment for the hot metal piece fed into the die by the plunger during the forward or feeding movement of the plunger before the plunger has completed said movement, and the core, the ejector, the die and the plunger are relatively arranged as required to effect the formation, upon the completion of said movement of the plunger of a closed chamber which has the dimensions of the nut-blank to be made and is occupied by the nut-blank formed during said movement of the plunger.

Figure 13:
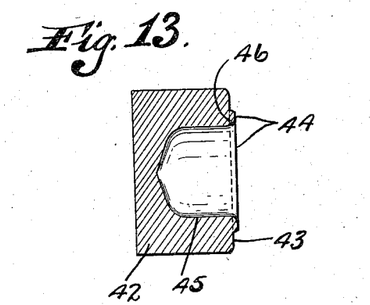
Fig. 13 is a side view in central section of a nut-blank made by our improved machine.
Figure 14:
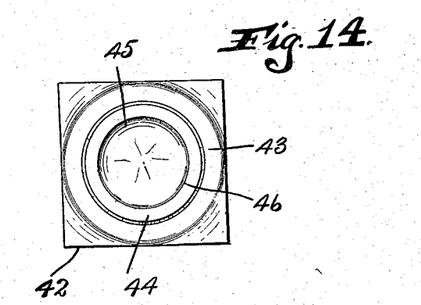
Fig. 14 is a right-hand end view relative to Fig 13.

The nut-blank 42 made by our improved machine is shown in Figs. 7, 13 and 14. As shown in Figs. 13 and 14 said blank is provided at one end with a crown-face 43 which comprises an annular shoulder 44 forming the central portion of said crown-face and arranged concentrically relative to the axis of the blank. Said blank is also provided with a cavity 45 which is circular in end view and arranged at and centrally of the crown-face 43 and surrounded by the shoulder 44. The shoulder 44 is adapted to form the central portion of the crown-face of a finished nut made from our improved nut-blank and an abutment for a check-nut or lock-nut, and it will be observed that the cavity 45 is arranged concentrically relative to said shoulder and extends from said crown-face formed on one end of the blank axially of the blank in the direction of but is spaced from the opposite end of the blank. The shoulder 44 is substantially uniform in width circumferentially of the cavity 45 which flares at its mouth, as at 46, in the direction of the crown-face of the blank to facilitate the entrance into the blank of a punching tool (not shown) subsequently employed in the elongation of the cavity. As said cavity extends into the blank from the crown-face of the blank and is formed concentrically relative to the shoulder 44 so as to permit the introduction into the cavity at said crown-face of the tool employed in elongating the cavity, the concentricity of the cavity at said crown-face relative to said shoulder and the uniformity in width of said shoulder circumferentially of the cavity are not disturbed or interfered with during the elongation of the cavity or during the tapping of the blank to form a finished nut. It is obvious that the core M forms the cavity 45; that the metal displaced into the recess 38 in the forward end of the ejector forms the shoulder 44; that the shoulder 40 on the rear end of the core forms the flaring mouth 46 of the cavity 45, that the forwardly tapering or conical forward end of the core facilitates an equal distribution of the metal circumferentially of the core during the pressing of the piece of hot metal into the external shape and dimensions of the blank, and that by our improved machine is effected the reduction to a minimum of the amount of metal required in forming the desired blank.

Of course the mechanism, hereinbefore described for operating the plunger and the mechanism hereinbefore described for operating the blank-ejector are so relatively arranged and timed that the ejector is moved forwardly to eject the blank from the die during the receding movement of the plunger upon the formation of the blank; that the plunger recedes far enough during the blank-ejecting movement of the ejector to permit the blank to be freely ejected from the die by the ejector, and that the ejector shall have moved forwardly to or beyond the forward end of the die and ejected the blank from the die upon the last-mentioned movement of the plunger.

What we claim is:—

1. In a machine for making hot-pressed nut-blanks, the combination, with a tubular die for receiving the hot-metal piece to be pressed into the form of a nut-blank; an endwise movable plunger extending the maximum distance into said die from the face of the die or spaced the maximum distance from the die according as the plunger is in the one or the other of its extreme positions, and a tubular ejector extending into said die from the opposite end and movable endwise of the die, of a core arranged centrally and longitudinally of the rear portion of said die and centrally of the ejector and extending forwardly of the ejector in the extreme rearward position of the ejector, which core is circular in end view and parallel with the die and provided at its rear end and externally with a forwardly and laterally facing sloping annular shoulder, the aforesaid plunger being spaced in its extreme forward position from but arranged in suitable proximity to the core, and the core being small enough transversely to permit movement of the ejector endwise of the core.

2. In a machine for making hot-pressed nuts, a tubular die; an endwise movable plunger extending the maximum distance into the die from the face of the die or spaced the maximum distance from the die according as the plunger is in the one or the other of its extreme positions; a tubular ejector extending into the die from the opposite end and movable endwise of the die; a slide carrying the ejector and arranged rearward of and movable toward and from the die; means for actuating said slide forwardly and rearwardly; means for limiting rearward movement of the slide, and a stationary rod arranged centrally and longitudinally of the ejector and extending loosely through the ejector in the extreme rearward position of the ejector, which rod extends loosely through said slide and terminates at its forward end in a core arranged centrally and longitudinally of the rear portion of the die and extending forwardly from the face of the ejector in the aforesaid position of the ejector, said core being small enough transversely to permit movement of the ejector endwise of the core and arranged to form an abutment for the metal piece fed into the die by the plunger during the feeding movement of the plunger before the plunger has completed said movement.

3. In a machine for making hot-pressed nuts, a tubular die; an endwise movable plunger extending the maximum distance into the die from the face of the die or spaced the maximum distance from the die according as the plunger is in the one or the other of its extreme positions; a tubular ejector extending into the die from the opposite end and movable endwise of the die; a slide carrying the ejector and arranged rearward of and movable toward and from the die; a stationary cross-bar arranged transversely of the travel of the slide and adapted to limit rearward movement of the slide, and a rod arranged centrally and longitudinally of the ejector and extending loosely through the ejector in the extreme rearward position of the ejector, which rod extends loosely through said slide and is secured to the aforesaid cross-bar, said rod terminating at its forward end in a core which is arranged centrally and longitudinally of the rear portion of the die and extends forwardly from the face of the ejector in the aforesaid position of the ejector, said core being small enough transversely to permit movement of the ejector endwise of the core and arranged to form an abutment for the metal piece fed into the die by the plunger during the feeding movement of the plunger before the plunger has completed said movement.

4. In a machine for making hot-pressed nuts, a tubular die; an endwise movable plunger extending the maximum distance into said die from the face of the die or spaced the maximum distance from the die according as the plunger is in the one or the other of its extreme positions; a tubular ejector extending into the die from the opposite end and movable endwise of the die; a slide carrying the ejector and arranged rearward of and movable toward and from the die; a stationary cross-bar arranged at a right angle to the travel of the slide, and a rod which is arranged centrally and longitudinally of the ejector and extends loosely through the ejector in the extreme rearward position of the ejector, which rod is secured to said cross-bar and terminates at its forward end in a core arranged centrally and longitudinally of the rear portion of the die, which core extends forwardly from the face of the ejector in the aforesaid position of the ejector and is small enough transversely to permit movement of the ejector endwise of the core and arranged to form an abutment for the metal piece fed into the die by the plunger during the feeding movement of the plunger before the plunger has completed said movement, the slide having two shoulders arranged at opposite sides respectively of the aforesaid rod and abutting against the forward side of the aforesaid cross-bar in the extreme rearward position of the ejector.

5. In a machine for making hot-pressed nuts, a tubular die; an endwise movable plunger extending the maximum distance into the die from the face of the die or spaced the maximum distance from the die according as the plunger is in the one or the other of its extreme positions; a tubular ejector extending into the die from the opposite end and movable endwise of the die; a slide carrying the ejector and arranged rearward of and movable toward and from the die; a stationary cross-bar arranged rearward and transversely of the travel of the ejector; an endwise adjustable rod arranged centrally and longitudinally of the ejector and extending loosely through the ejector in the extreme rearward position of the ejector, which rod extends through the cross-bar and terminates at its forward end in a core arranged centrally and longitudinally of the rear portion of the die, which core extends forwardly from the face of the ejector in the aforesaid position of the ejector and is arranged to form an abutment for the metal piece fed into the die by the plunger during the feeding movement of the plunger before the plunger has completed said movement, and means for securing the rod to the cross-bar in the desired adjustment of the rod.

6. In a machine for making hot-pressed nuts, a tubular die; an endwise movable plunger extending the maximum distance into the die from the face of the die or spaced the maximum distance from the die according as the plunger is in the one or the other of its extreme positions; a tubular ejector extending into the die from the opposite end and movable endwise of the die; a slide carrying the ejector and arranged rearward of and movable toward and from the die; a stationary cross-bar arranged rearward of the travel of the ejector; a rod arranged centrally and longitudinally of the ejector and extending loosely through the ejector in the extreme rearward position of the ejector, which rod extends loosely through the slide and through and rearwardly of the cross-bar and is screw-threaded from a point forward of the cross-bar to a point rearward of the cross-bar and terminates at its forward end in a core arranged centrally and longitudinally of the rear portion of the die, which core extends forwardly from the face of the ejector in the aforesaid position of the ejector and is arranged to form an abutment for the metal piece fed into the die by the plunger during the feeding movement of the plunger before the plunger has completed said movement; a nut screwed onto the rod at the rear side of the cross-bar, and a centrally and longitudinally split nut screwed onto the rod at the forward side of the cross-bar and having a circular rear end-portion extending into the cross-bar.

7. In a machine for making hot-pressed nuts, a tubular die; an endwise movable plunger extending the maximum distance into the die from the face of the die or spaced its maximum distance from the die according as the plunger is in the one or the other of its extreme positions; a shaft operatively connected with said plunger; a tubular ejector extending into the die from the opposite end and movable endwise of the die; a core arranged centrally and longitudinally of the rear portion of the die and centrally of the ejector and extending forwardly from the face of the ejector in the extreme rearward position of the ejector, which core is arranged to form an abutment for the hot metal piece fed into the die by the plunger during the feeding movement of the plunger before the plunger has completed said movement, and means whereby the aforesaid ejector is actuated in opposite directions alternately during the rotation of the aforesaid shaft continuously in one and the same direction, the aforesaid core being held stationary during the movement of the plunger and during the movement of the ejector, and the parts being so relatively arranged and timed that the ejector is in its extreme rearward position upon the feeding of a hot metal piece into the die by the plunger and the ejector moves forwardly during the receding movement of the plunger.

8. In a machine for making hot-pressed nuts, a tubular die; an endwise movable plunger extending the maximum distance into the die from the face of the die or spaced its maximum distance from the die according as the plunger is in the one or the other of its extreme positions; a shaft operatively connected with said plunger; a tubular ejector extending into the die from the opposite end and movable endwise of the die; a core arranged centrally and longitudinally of the rear portion of the die and centrally of the ejector and extending forwardly from the face of the ejector in the extreme rearward position of the ejector, which core is arranged to form an abutment for the hot metal piece fed into the die by the plunger during the feeding movement of the plunger before the plunger has completed said movement; a suitably supported rock-shaft parallel with the first-mentioned shaft; means whereby the rock-shaft is rocked in opposite directions alternately during the rotation of said first-mentioned shaft continuously in one and the same direction, and means whereby the aforesaid ejector is actuated endwise in the one direction or the other according as the rock-shaft is rocked in the one or the other direction, the parts being so relatively arranged and timed that the ejector is in its extreme rearward position upon the feeding of a hot metal piece into the die by the plunger and the ejector moves forwardly during the receding movement of the plunger.

In testimony whereof, we sign the foregoing specification, in the presence of two witnesses.

WILLIAM S. BIDLE.
JOSEPH A. COSTELLO.

Witnesses:
B. C. BROWN,
H. L. McDONNELL.